United States Patent
Choe et al.

(10) Patent No.: US 11,636,600 B1
(45) Date of Patent: Apr. 25, 2023

(54) METHOD AND APPARATUS FOR DETECTING PORES BASED ON ARTIFICIAL NEURAL NETWORK AND VISUALIZING THE DETECTED PORES

(71) Applicant: LULULAB INC., Seoul (KR)

(72) Inventors: Yongjoon Choe, Seoul (KR); Sun Yong Seo, Seoul (KR); Jong Ha Lee, Hwaseong-si (KR); Sang Wook Yoo, Seoul (KR)

(73) Assignee: LULULAB INC., Seoul (KR)

( * ) Notice: Subject to any disclaimer, the term of this patent is extended or adjusted under 35 U.S.C. 154(b) by 0 days.

(21) Appl. No.: 17/967,264

(22) Filed: Oct. 17, 2022

(30) Foreign Application Priority Data

Feb. 23, 2022 (KR) .................. 10-2022-0023734
Apr. 25, 2022 (KR) .................. 10-2022-0050810

(51) Int. Cl.
*G06T 7/00* (2017.01)
*G06T 7/60* (2017.01)
(Continued)

(52) U.S. Cl.
CPC .............. *G06T 7/0014* (2013.01); *G06T 3/40* (2013.01); *G06T 7/12* (2017.01); *G06T 7/194* (2017.01); *G06T 7/60* (2013.01); *G06T 2207/20021* (2013.01); *G06T 2207/20076* (2013.01); *G06T 2207/20081* (2013.01); *G06T 2207/20084* (2013.01); *G06T 2207/20132* (2013.01); *G06T 2207/20212* (2013.01); *G06T 2207/30088* (2013.01); *G06T 2207/30201* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 2011/0150301 A1* | 6/2011 | Song | G06V 40/172 382/118 |
| 2022/0012953 A1* | 1/2022 | Powers | G06V 40/166 |

FOREIGN PATENT DOCUMENTS

| | | | | |
|---|---|---|---|---|
| CN | 104299011 A | * | 1/2015 | ......... G06K 9/00234 |
| CN | 105069818 A | * | 11/2015 | |

(Continued)

OTHER PUBLICATIONS

Notice of Result of Preliminary Examination for KR 10-2022-0050810 dated Jun. 15, 2022.
Notice of Allowance for KR 10-2022-0050810 dated Aug. 3, 2022.

*Primary Examiner* — Jiangeng Sun
(74) *Attorney, Agent, or Firm* — Sughrue Mion, PLLC

(57) ABSTRACT

According to various embodiments, a pore visualization service providing server based on artificial intelligence may include a data pre-processor for obtaining a user's face image captured by a user terminal from the user terminal and performing pre-processing based on facial feature points based on the face image; a pore image extractor for generating a pore image corresponding to the user's face image by inputting the user's face image that has been pre-processed through the data pre-processing into an artificial neural network; a data post-processor for post-processing the generated pore image; and a pore visualization service providing unit for superimposing the post-processed pore image on the face image and transmitting a pore visualization image to the user terminal.

5 Claims, 5 Drawing Sheets

(51) Int. Cl.
*G06T 7/12* (2017.01)
*G06T 7/194* (2017.01)
*G06T 3/40* (2006.01)

(56) References Cited

FOREIGN PATENT DOCUMENTS

| | | | | |
|---|---|---|---|---|
| CN | 107437073 A | * | 12/2017 | ......... G06K 9/00228 |
| CN | 107679507 A | * | 2/2018 | ......... G06K 9/00228 |
| CN | 109522429 A | * | 3/2019 | ........... G06T 7/0002 |
| CN | 113129315 A | * | 7/2021 | |
| KR | 10-0777057 B1 | | 11/2007 | |
| KR | 10-2016-0059768 A | | 5/2016 | |
| KR | 10-1931271 B1 | | 12/2018 | |
| KR | 10-2019-0021360 A | | 3/2019 | |
| KR | 10-2020-0118842 A | | 10/2020 | |

* cited by examiner

[FIG. 1]
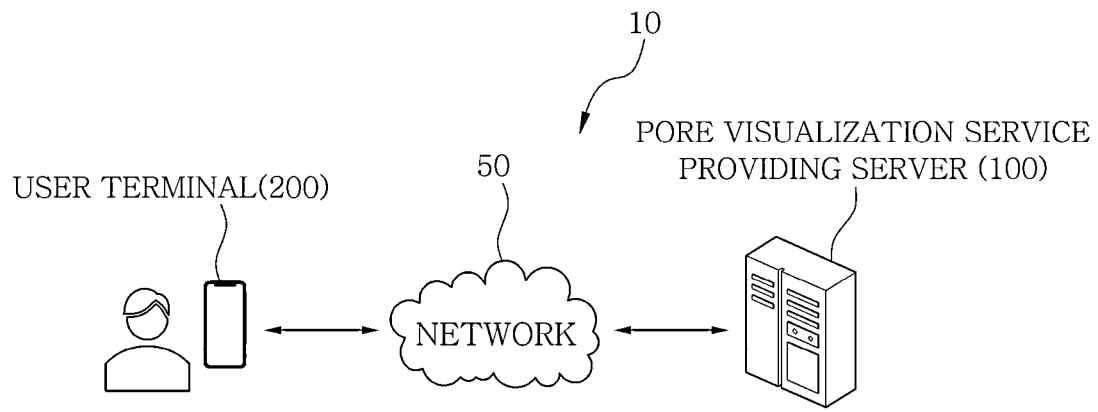
[FIG. 2]
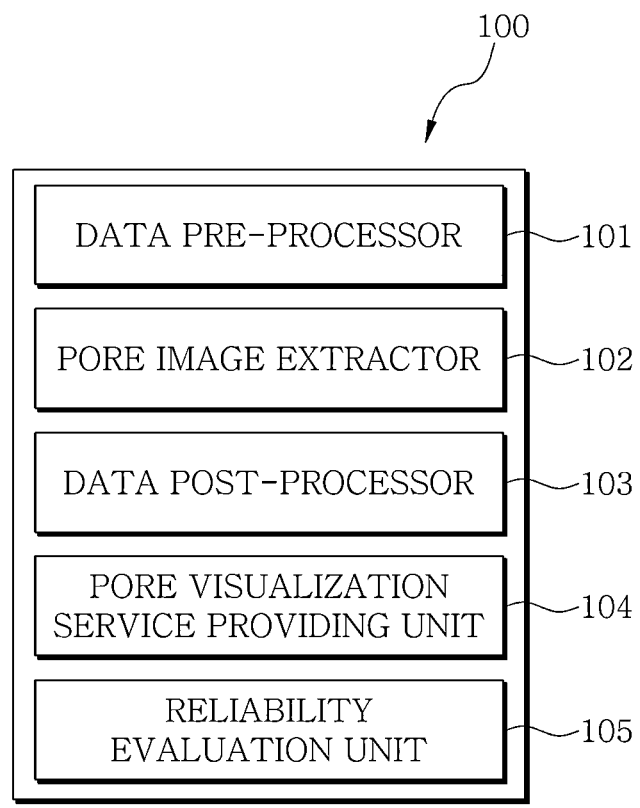

[FIG. 3]
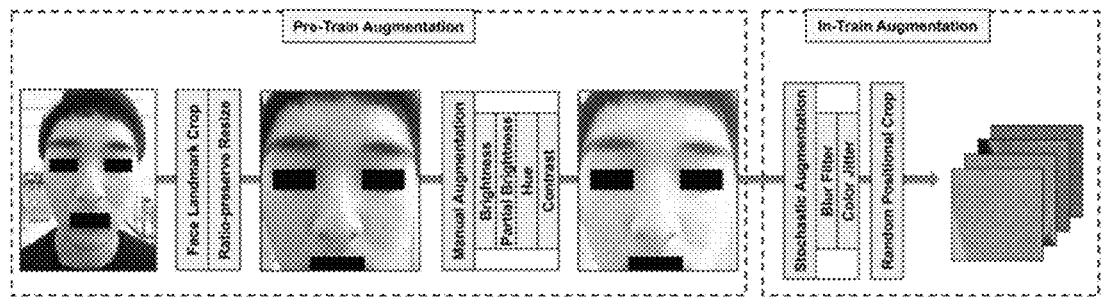

[FIG. 4]
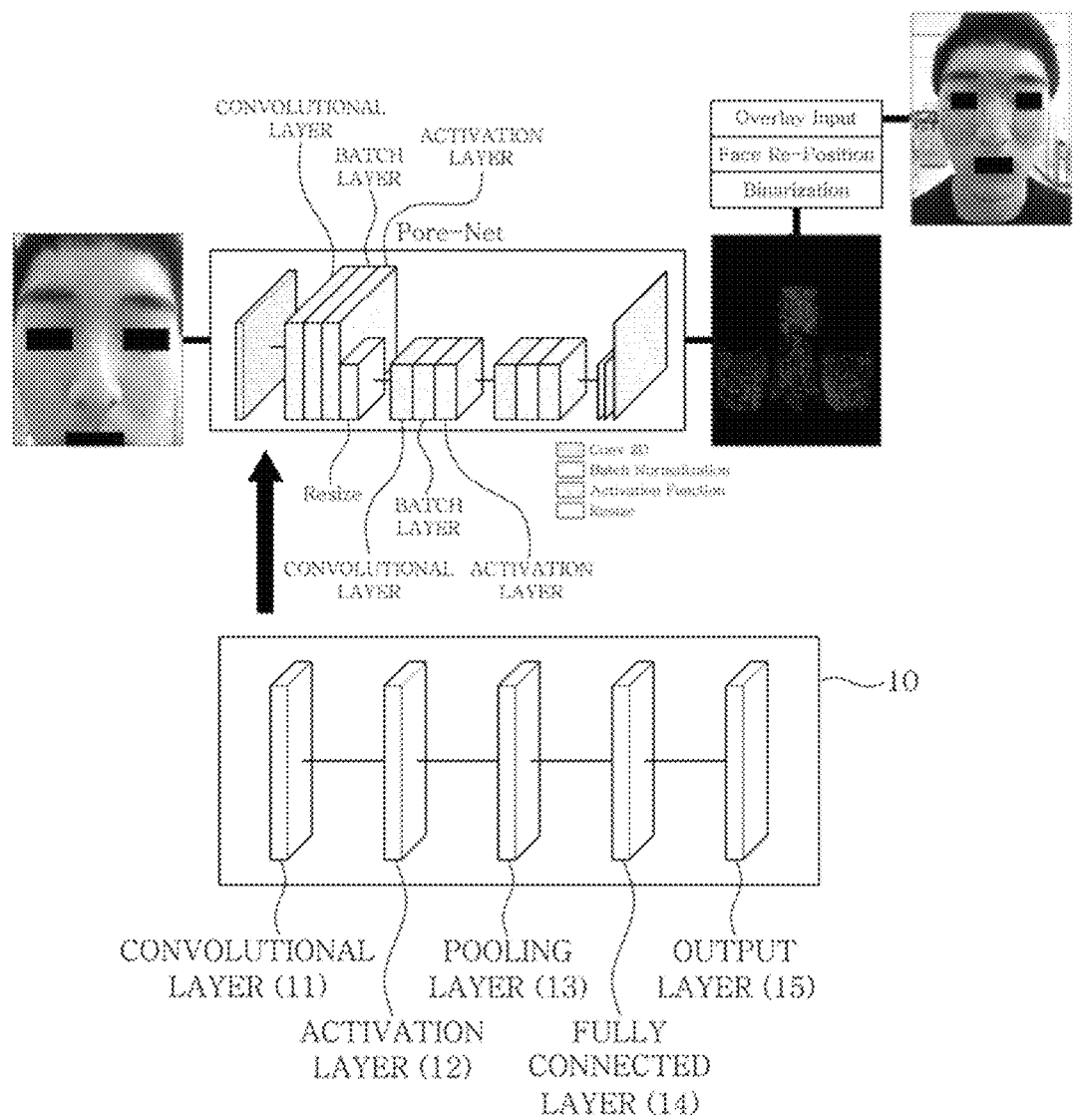

[FIG. 5]
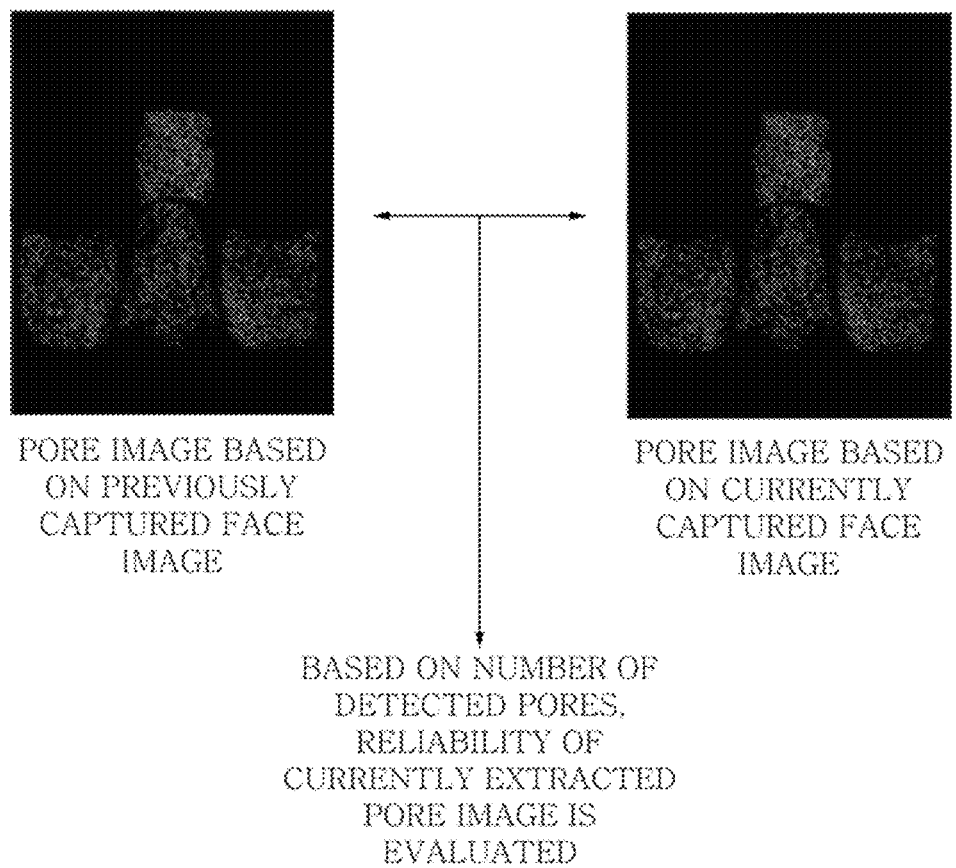

[FIG. 6]
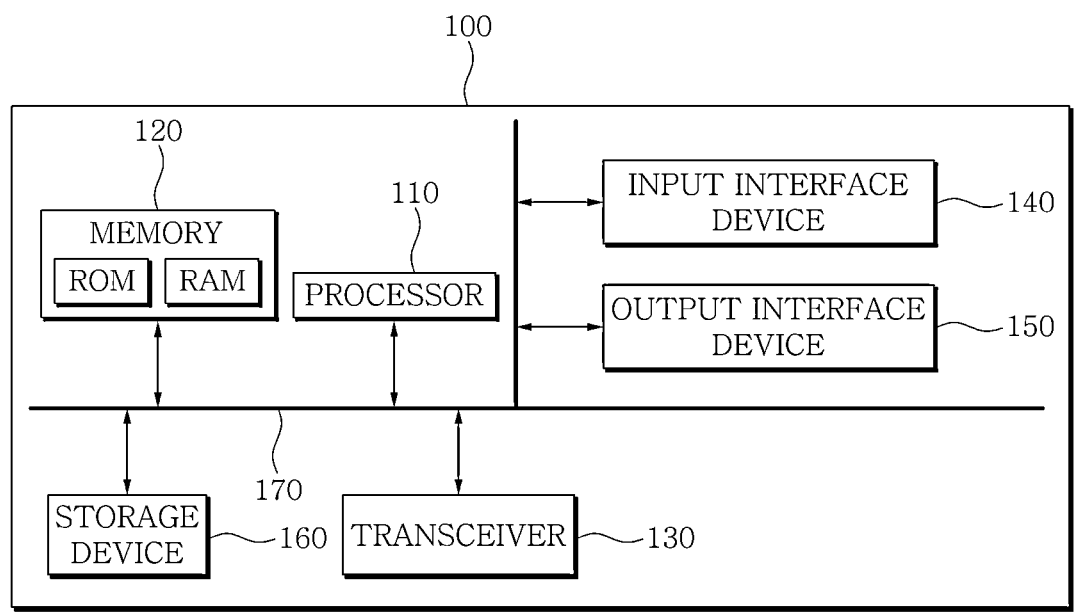

METHOD AND APPARATUS FOR DETECTING PORES BASED ON ARTIFICIAL NEURAL NETWORK AND VISUALIZING THE DETECTED PORES

CROSS-REFERENCE TO RELATED APPLICATION

This application claims priority to Korean Patent Application Nos. 10-2022-0023734, filed Feb. 23, 2022 and 10-2022-0050810, filed on Apr. 25, 2022, in the Korean Intellectual Property Office, the disclosure of which is incorporated herein by reference.

BACKGROUND OF THE DISCLOSURE

Field of the Disclosure

The present disclosure relates to a method of detecting and visualizing pores based on an artificial neural network and an apparatus therefor.

Description of the Related Art

Pores are holes formed in the skin where hair grows, and sebum secreted by the sebaceous glands may flow out through the pores. The condition of pores is an important factor in determining the condition and age of the skin, and enlarged pores are a big concern for modern people who are interested in skin care. Even people with clear skin look older when their pores are wide. In addition, even with makeup, the enlarged pores are clearly visible. For this reason, interest in skin care for men as well as women is increasing. As interest in skin care has greatly increased, various skin care product manufacturers are actively researching a pore measurement method, which is a basic skin condition measurement method.

According to this trend, various methods of measuring skin pores have been proposed. For example, Korean Patent No. 10-0777057 discloses a method of measuring skin pores including a photographing step of photographing a skin to be measured, an image processing step of sampling and amplifying a portion including pores in the photographed skin image and removing noise, a step of measuring the area of the pores using the processed pore image, and a visualization step of outputting the measured value on a monitor so that a user may visually check the pores. According to the method, the area and number of pores are analyzed using a one-dimensional image obtained by photographing. However, due to change in a face angle according to a subject's posture, reproducibility is reduced and image analysis is difficult. Accordingly, it is difficult to detect change in pores in detail.

In addition, among methods of measuring skin pores, a conventional method of detecting pores based on an image processing algorithm cannot provide the accuracy of a process and reasonable computational cost. In addition, in the conventional method, a specific input image captured in a light-controlled environment is required.

Therefore, an algorithm capable of dividing or detecting pores with a low computational cost using an image captured by a self-camera as an input and visualizing the pore image to a user through a user terminal is required.

Description of the related art aims to improve understanding of the background of the invention, and may include matters that are not already known to those of ordinary skill in the art to which the present invention pertains.

SUMMARY OF THE DISCLOSURE

Therefore, the present disclosure has been made in view of the above problems, and it is an object of the present disclosure to provide a pore segmentation algorithm having high accuracy and consistency by using facial feature points in an obtained face image.

It is another object of the present disclosure to provide an algorithm capable of detecting pores with a low computational cost and visualizing an image of the detected pores to a user through a user terminal.

The technical problems that are intended to be achieved in the present disclosure are not restricted to the above described problems, and other problems, which are not mentioned herein, could be clearly understood by those of ordinary skill in the art from details described below.

In accordance with one aspect of the present disclosure, provided is a pore visualization service providing server based on artificial intelligence including a data pre-processor for obtaining a user's face image captured by a user terminal from the user terminal and performing pre-processing based on facial feature points based on the face image; a pore image extractor for generating a pore image corresponding to the user's face image by inputting the user's face image that has been pre-processed through the data pre-processing into an artificial neural network; a data post-processor for post-processing the generated pore image; and a pore visualization service providing unit for superimposing the post-processed pore image on the face image and transmitting a pore visualization image to the user terminal.

According to various embodiments, the pore image extractor may include a pore image extraction model that is subjected to supervised learning using training data composed of a training input value corresponding to a face image of each of the users and a training output value corresponding to a pore image and generates the pore image corresponding to the user based on a deep learning network consisting of a plurality of hidden layers.

The pore image extractor may input the pre-processed face image of the user into a pore image extraction model, which is the artificial neural network based on a convolutional neural network (CNN), and may generate the pore image corresponding to the face image based on an output of the pore image extraction model.

According to various embodiments, the pore image extraction model may include a feature map extraction layer including at least one convolutional layer that receives a learning feature vector obtained by transforming learning data according to a face image of a preset size, at least one activation layer, and at least one pooling layer; a fully-connected layer that transmits an output vector calculated using output values received from the feature map extraction layer to an output layer; and an output layer that determines a probability corresponding to the output vector by applying an activation function to the output vector, and outputs an output vector having the highest determined probability.

According to various embodiments, the data pre-processor may set facial feature points for the face image through an open source library for images including faces. When a user's face is tilted in a specific direction within a preset angle range with respect to the facial feature points, the data pre-processor may adjust an orientation of the user's face in a direction opposite to the specific direction. The data pre-processor may set a rectangular boundary including a face region of the user based on the facial feature points, may crop a background region excluding the set rectangular boundary, and may adjust a resolution of the face image to a preset resolution while maintaining an aspect ratio of the face image with the background region cropped. When the resolution of the face image is less than the preset resolution, the data pre-processor may insert a black region into a region excluding the face region.

According to various embodiments, the data post-processor may binarize the generated pore image. Based on cropping information and warping information included in the facial feature points, the data post-processor may correct a position of the binarized pore image so that the binarized pore image corresponds to each pixel of the face image.

According to various embodiments, the pore image extraction model may calculate a loss function according to the following equation using an output vector obtained as an output of the hidden layers when the training input value is input and a training output vector indicating a pore image according to the training output value, and may be subjected to supervised learning such that a result value of the calculated loss function (e.g., a mean squared error (MSE)) is minimized.

$$MSE = \frac{1}{N}\sum_{m}(Y_m - \hat{Y}_m)^2$$

In the equation, $Y_m$ represents an m-th actual output vector obtained as an output of the hidden layers, and $Y'_m$ represents an m-th prediction output vector (Y') predicted as an output of the hidden layers.

According to various embodiments, the fully-connected layer may include a plurality of hidden layers. When an output value is transmitted to an output layer, drop-out may be applied based on a probability determined according to the number of neurons of the fully-connected layer. A probability determined according to the number of the hidden layers and the number of neurons of each of the hidden layers may be defined by the following equation.

$$p = \sqrt{NRn \cdot HDn}$$

In the equation, NRn represents the average number of neurons included in the hidden layers, and HDn represents the total number of the hidden layers.

According to various embodiments, the pore visualization service providing server may further include a reliability evaluation unit for calculating reliability of the generated pore image. The reliability evaluation unit may calculate a first number of pores detected based on the extracted pore image, may calculate a second number of pores detected based on a previous pore image extracted based on a previous face image of the user captured before capturing the face image, and may evaluate reliability of the extracted pore image by comparing the first and second numbers. In this case, the reliability may be calculated by the following equation.

$$y = 100 / \left( \sqrt{\left(\frac{\sum_{i=1}^{i=n} s_i}{n} - p\right)^2} + 1 \right)$$

In the equation, y represents reliability, $s_i$ represents the number of pores detected based on a pore image corresponding to an i-th face image, and p represents the number of pores detected based on a current pore image.

According to various embodiments, the pore visualization service providing unit may calculate a pore condition score for each of a plurality of face images according to sizes of pores detected based on each of the face images, may calculate the number of pixels occupied by each of the detected pores, may calculate the pore condition score based on a sum of the calculated pixel number, may arrange pore visualization images corresponding to the face images according to time order or pore condition score order, and may transmit the arranged pore visualization images to the user terminal.

According to various embodiments, the pore image extraction model may include a first block including a first convolutional layer, a first arrangement layer, and a first activation layer; a second block including a second convolutional layer, which is a subsequent layer of the first block, a second arrangement layer, and a second activation layer; and a third block including a third convolutional layer, which is a subsequent layer of the second block, a third arrangement layer, and a third activation layer. In the pore image extraction model, the size of a learnable filter for the first convolutional layer may be 7 pixels. Each of the filters may have an interval of 1 pixel. A padding value, which is the number of elements added to a face image input to the pore image extraction model, may be adjusted to 3. An ReLu function may be applied to the first activation layer, and a sigmoid function may be applied to the third activation layer.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a system according to one embodiment;

FIG. 2 is a diagram showing the major components of a pore visualization service providing server;

FIG. 3 is a diagram illustrating a process of performing data pre-processing on a user's face image obtained from a user terminal;

FIG. 4 is a diagram illustrating the structure of a pore image extraction model according to one embodiment and post-processing of a pore image that is an output of the model;

FIG. 5 is a diagram for explaining evaluation of the reliability of an extracted pore image; and FIG. 6 is a diagram showing the hardware configuration of the pore visualization service providing server shown in FIG. 1.

DETAILED DESCRIPTION OF THE DISCLOSURE

Since the present disclosure may be applied with various modifications and may have various embodiments, exemplary embodiments and drawings of the present disclosure are intended to be explained and exemplified. However, these exemplary embodiments and drawings are not intended to limit the embodiments of the present disclosure to particular modes of practice, and all changes, equivalents, and substitutes that do not depart from the spirit and technical scope of the present disclosure should be understood as being encompassed in the present disclosure. Like reference numerals refer to like elements in describing each drawing.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure. As used herein, the term "and/or" includes any or all combinations of one or more of the associated listed items.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present.

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments according to the present disclosure will be described in detail with reference to the accompanying drawings.

FIG. 1 is a diagram illustrating a pore visualization service providing system 10 according to one embodiment. Referring to FIG. 1, the pore visualization service providing system 10 may include a pore visualization service providing server 100, a user terminal 200, and the like.

In addition to the server 100, the operations described below may also be implemented by the user terminal 200. That is, the operations described below performed by a data pre-processor 101, a pore image extractor 102, a data post-processor 103, a pore visualization service providing unit 104, and a reliability evaluation unit 105 may be understood as modules operated by a processor included in the user terminal 200. That is, the server 100 is described as one operating subject as an example of hardware performing a software operation, and it will be apparent at the level of a person skilled in the art that such an operating subject may be the user terminal 200.

As another embodiment, the operations described below may be performed or implemented through a platform (e.g., a web page and/or an application) controlled by the pore visualization service providing server 100. That is, the pore visualization service providing server 100 may provide a website where a user may access the pore visualization service providing server 100 through a network using the user terminal 200 to input, register, and output various information, and may provide an application capable of inputting, registering, and outputting various information by being installed and executed in the user terminal 200.

The pore visualization service providing server 100 may generate a pore visualization image so that user's pores may be visually confirmed based on a user's face image obtained from the user terminal 200, and may transmit the generated pore visualization image to the user terminal 200.

The user terminal 200 may include at least one camera and processor. A user's face image may be captured by the camera. The user terminal 200 may transmit the captured user's face image to the pore visualization service providing server 100. The user terminal 200 may be a device or apparatus having a communication function, such as a desktop computer, a laptop computer, a notebook, a smartphone, a tablet PC, a mobile phone, a smart watch, a smart glass, an e-book reader, a portable multimedia player (PMP), a handheld game console, a navigation device, a digital camera, a digital multimedia broadcasting (DMB) player, a digital audio recorder, a digital audio player, a digital video recorder, a digital video player, or a personal digital assistant (PDA).

The pore visualization service providing server 100 and the user terminal 200 may be connected to a communication network, respectively, and may transmit/receive data to and from each other through the communication network. For example, as the communication network, various wired or wireless networks such as a local area network (LAN), a metropolitan area network (MAN), Global System for Mobile Network (GSM), Enhanced Data GSM Environment (EDGE), High-Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX(IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX), and 5G may be used.

FIG. 2 shows the major components of the pore visualization service providing server 100.

The pore visualization service providing server 100 may include the data pre-processor 101, the pore image extractor 102, the data post-processor 103, the pore visualization service providing unit 104, the reliability evaluation unit 105, and the like.

The data pre-processor 101 may obtain a user's face image captured by the user terminal 200 from the user terminal 200. The data pre-processor 101 may perform pre-processing based on facial feature points based on the user's face image. The pre-processing may include processes performed before the face image is input to an artificial neural network model (e.g., a pore-net and/or pore image extraction model).

The pore image extractor 102 may input a user's face image pre-processed through the data pre-processor 101 into an artificial neural network model (e.g., a pore image extraction model). In addition, the pore image extractor 102 may train the artificial neural network model (e.g., a pore image extraction model) by using a plurality of face images obtained from a plurality of user terminals as learning data. The pore image extractor 102 may extract a pore image corresponding to the face image as an output of the artificial neural network model. The pore image extractor 102 may transmit the extracted pore image to the data post-processor 103.

The data post-processor 103 may binarize the extracted pore image. The data post-processor 103 may adjust the size and/or angle of the binarized pore image so that the pore image is mapped to the user's face image.

The pore visualization service providing unit 104 may perform pore visualization by superimposing the adjusted pore image on the user's face image. The pore visualization service providing unit 104 may transmit the pore visualization image to the user terminal 200.

The pore visualization service providing unit 104 may calculate a pore condition score for the face image according to the sizes of pores detected based on the face image. The pore visualization service providing unit 104 may calculate the number of pixels occupied by each of the detected pores. Based on a sum of the calculated pixel number, the pore visualization service providing unit 104 may calculate a pore condition score. For example, when a large number of pores exist or the size of pores is large, many pores may be detected in pixels constituting an image.

The pore visualization service providing unit 104 may transmit a plurality of pore visualization images obtained through a plurality of face images to the user terminal 200. The pore visualization service providing unit 104 may arrange pore visualization images according to a preset condition (e.g., time order, pore condition score order), and may transmit the arranged pore visualization images to the user terminal 200.

The reliability evaluation unit 105 may evaluate the reliability of the extracted pore image. That is, in a process of extracting a pore image, pore-like patterns such as pigmentation and oval-shaped wrinkles may be extracted. Thus, the reliability evaluation unit 105 may calculate the reliability of the extracted pore image.

FIG. 3 is a diagram illustrating a process of performing data pre-processing on a user's face image obtained from a user terminal. As shown in FIG. 3, data pre-processing may be divided into pre-train augmentation performed before model training and in-train augmentation performed probabilistically during model training.

The data pre-processor 101 may set facial feature points for a user's face image. That is, the data pre-processor 101 may set facial feature points through an open source library for images including faces.

The data pre-processor 101 may adjust the angle of a user's face detected in the face image with respect to the generated feature points. For example, when a user's face is tilted in a specific direction within a preset angle range, the data pre-processor 101 may adjust an orientation of the user's face in a direction opposite to the specific direction. The adjusted face angle may be included in feature point information.

The data pre-processor 101 may set a region of interest (ROI) based on the generated feature points. That is, the data pre-processor 101 may apply an ROI mask to a region expected to be a user's facial pore cluster.

The data pre-processor 101 may crop a background region based on the set facial feature points. That is, the data pre-processor 101 may crop a background region excluding a rectangular region including a face region of a user based on the set feature points.

The data pre-processor 101 may adjust a resolution of the face image to a preset resolution (e.g., 1024×1280) while maintaining an aspect ratio of the face image with the background region cropped. When the resolution of the cropped face image is less than the preset resolution (e.g., 1024×1280), the data pre-processor 101 may fill a region (blank) excluding the face region with a black region. The data pre-processor 101 may perform an operation of adjusting resolution while maintaining a cropping ratio as described above to standardize the size of pores to a specific size for face images having different photographing distances.

The data pre-processor 101 may perform correction according to a preset guide (procedure). The correction according to the preset guide may include correction for hue, brightness, contrast, and partial brightness.

In addition, the data pre-processor 101 may perform random HSV (hue, saturation, value) adjustment in a specific range based on a Gaussian blur filter having a kernel size of 3.

FIG. 4 is a diagram illustrating the structure of a pore image extraction model according to one embodiment and post-processing of a pore image that is an output of the model.

Referring to FIG. 4, a convolutional neural network 10 according to one embodiment may include a convolutional layer 11 that receives image frames of a preset size as input images and extracts a feature map, an activation layer 12 that determines whether to activate an output using an activation function for the extracted features, a pooling layer 13 that performs sampling on the output according to the activation layer 12, a fully-connected layer 14 that performs classification according to class, and an output layer 15 that finally outputs an output according to the fully-connected layer 14.

The convolutional layer 11 may be a layer that extracts the features of input data by convolution of an input image and a filter. Here, the filter may be a function that detects a characteristic portion of an input image, may be generally expressed as a matrix, and may be a function determined as being continuously trained by learning data. The feature extracted by the convolutional layer 11 may be referred to as a feature map. In addition, an interval value for which convolution is performed may be referred to as a stride, and a feature map having a different size may be extracted according to a stride value. In this case, when the filter is smaller than an input image, the feature map has a smaller size than an existing input image. A padding process may be additionally performed to prevent loss of features through several steps. In this case, the padding process may be a process of keeping the size of an input image and the size of a feature map the same by adding a preset value (e.g., 0 or 1) to the outside of the generated feature map.

Here, as the convolutional layer 11 according to one embodiment of the present disclosure, a structure in which a 1×1 convolutional layer and a 3×3 convolutional layer are sequentially and repeatedly connected may be used, but the present disclosure is not limited thereto.

The activation layer 12 is a layer that determines whether to activate by converting a feature extracted with a certain value (or matrix) into a non-linear value according to an activation function. As the activation function, a sigmoid function, an ReLU function, a softmax function, or the like may be used. For example, the softmax function may be a function with a characteristic that all input values are normalized to values between 0 and 1, and the sum of output values is always 1.

The pooling layer 13 may be a layer that selects a feature representing a feature map by performing subsampling or pooling on an output of the activation layer 12. Max pooling for extracting the largest value for a certain region of the feature map, average pooling for extracting an average value, or the like may be performed. In this case, the pooling layer is not necessarily performed after the activation function, but may be selectively performed.

In addition, the convolutional neural network 10 may include a plurality of connection structures for the convolutional layer 11, the activation layer 12, and the pooling layer 13. For example, the convolutional neural network 10 may be a CNN-based shallow convolutional neural network (S-CNN), You Look Only Once (YOLO), Single Shot MultiBox Detector (SSD), Faster R-CNN, or the like, or may be a deep neural network of an improved form based thereon, but the present disclosure is not limited thereto.

In a method of detecting user's pores through a conventional artificial neural network model, the computational cost of an algorithm is not specified. Also, as the resolution of an input image increases, the cost of the algorithm increases exponentially. In this case, the cost of the algorithm may be similar to the cost of a pre-processing method. Accordingly, the pore image extraction model according to one embodiment may train Gaussian mixing algorithm-based S-CNN not to significantly increase the computation cost of an algorithm. Pores may be arranged at regular intervals and have a specific shape for each input image, and the pattern of the pores may not be significantly deformed except when the pattern is affected by lighting.

The pore image extraction model may include a shallow convolutional neural network (s-CNN). The s-CNN may be composed of nodes of multiple layers. A parameter may include a filter applied to each layer of the s-CNN. Each layer of the CNN may be a set of one or more learnable filters whose inputs to the layer are convolved. The convolution result of each of the filters may be used to generate the output of the layer. Then, the output of the layer may be passed to a subsequent layer for another set of convolutional operations to be performed by one or more filters of the subsequent layer. The parameters of a convolutional layer may consist of a set of a certain number of learnable filters (e.g., kernel). Each filter may be a rectangle with a width and a height. The filter may be a collection of weights.

The pore image extractor 102 may extract a pore shape of the same output size by using a convolutional layer having k=7, s=1, and p=3 in a first block, and then may use a batch normalization function and an ReLu activation function. A batch normalization layer may be used to normalize activation. Padding means filling the periphery of input data with a specific value (e.g., 0) before performing a convolution operation, and padding may prevent a data size from continuously decreasing due to iterative convolutional operation. The activation function may refer to a function that converts the sum of input signals into an output signal. When an input value exceeds 0, the ReLU function may output the input value. When an input value is less than or equal to 0, the ReLU function may output 0.

The pore image extractor 102 may increase a receptive field and reduce a computation cost by passing a value output from a first block through a second block including a maximum pooling layer with k=2.

In a third block, a 1×1 convolution layer is placed on a segment class, and a confidence map is expressed using a sigmoid function instead of an ReLu function. The sigmoid function has only one inflection point, and when an input value exceeds a threshold value, the inflection point may converge to one of a maximum value and a minimum value. 1×1 convolution may mean a 1×1 size filter, and may be used to preserve image's features. By using 1×1 convolution, the height and width of data may be the same, and the number of channels (depth, e.g., RGB→3) may be reduced. When the number of channels is reduced by using 1×1 convolution, the number of parameters may be reduced, and operation speed may increase as the amount of computation is reduced.

A feature map downscaled (reduced) by max pooling may correspond to the size of an original input face image to generate pixel-by-pixel matching pore images (e.g., a confidence map).

Since the pore image extraction model (e.g., Pore-Net, s-CNN) has shallow layers, the pore image extraction model may capture noise such as salt and pepper and pore-like skin features (e.g., pigmentation, wrinkles) in an input face image. Accordingly, the pore image extractor 102 may perform ROI aware learning using a mask predefined based on facial feature points, a predictive map, and a label map, so that the pore image extraction model is not affected by a loss function for avoidable noise.

The pore image extractor 102 may use a mean square error loss function having a label set of {0, 1} to train a pore image (e.g., a confidence map) for the pore image extraction model. A learning rate for the pore image extraction model may be between 0.1 and 1e-5 depending on a learning progress using a cosine annealing scheduler, and Adam optimization using weight attenuation may be applied.

The data post-processor 103 may binarize a pore image (e.g., a confidence map) extracted or generated through the pore image extraction model (e.g., Pore-Net) based on a preset threshold value. The data post-processor 103 may perform warping to match the binarized pore image (e.g., a confidence map) to a face image before being adjusted. The data post-processor 103 may warp (correct) the binarized pore image to the original position thereof based on cropping information recorded in facial feature points including a rotation angle.

The pore visualization service providing unit 104 may superimpose the pore image on a user's face image based on the binarized pore image and a predefined ROI mask. The pore visualization service providing unit 104 may generate a pore visualization image of a user based on the superimposed image.

FIG. 5 is a diagram for explaining evaluation of the reliability of an extracted pore image.

The reliability evaluation unit 105 may evaluate the reliability of the extracted pore image. That is, in a process of extracting a pore image, pore-like patterns such as pigmentation and oval-shaped wrinkles may be extracted. Thus, the reliability evaluation unit 105 may calculate the reliability of the extracted pore image.

Although the size or shape of pores may vary, the number of pores is constant. The reliability evaluation unit 105 may compare the number of pores detected based on a previously captured face image with the number of pores detected based on a currently captured face image. The reliability evaluation unit 105 may calculate the reliability of the generated pore image by comparing the number of pores.

The reliability evaluation unit 105 may calculate a first number of pores detected based on the extracted pore image and a second number of pores detected based on a previous pore image extracted based on a previous face image of the user captured before capturing the face image. The reliability evaluation unit 105 may calculate the number of pores detected based on each of previous pore images extracted based on a plurality of previous face images of a user previously captured. The reliability evaluation unit 105 may calculate the reliability of the extracted pore image based on the first and second numbers.

The reliability evaluation unit may calculate the reliability using Equation 1 below.

$$y = 100 / \left( \sqrt[*]{\left( \frac{\sqrt{\left(\sum_{i=1}^{i=n} s_i\right)^2}}{n} - p \right)^2} + 1 \right)$$ [Equation 1]

In Equation 1, y represents reliability, $s_i$ represents the number of pores detected based on a pore image corresponding to an i-th face image, and p represents the number of pores detected based on a current pore image. That is, since there should be no significant difference from the numbers of pores obtained from different face images, the difference may be calculated from the average of the numbers of pores obtained from different face images.

FIG. 6 is a diagram showing the hardware configuration of the pore visualization service providing server 100 shown in FIG. 1.

Referring to FIG. 6, the pore visualization service providing server 100 may include at least one processor 110 and a memory storing instructions instructing the processor 110 to perform at least one operation.

The at least one operation may include at least some of the operations or functions of the pore visualization service providing server 100 described above, and may be implemented in the form of instructions and performed by the processor 110.

The processor 110 may mean a central processing unit (CPU), a graphics processing unit (GPU), or a dedicated processor on which methods according to embodiments of the present disclosure are performed. Each of a memory 120 and a storage device 160 may be configured as at least one of a volatile storage medium and a non-volatile storage medium. For example, the memory 120 may be one of a read only memory (ROM) and a random access memory (RAM), and the storage device 160 may include a flash-memory, a hard disk drive (HDD), a solid state drive (SSD), various memory cards (e.g., a micro SD card), or the like.

In addition, the pore visualization service providing server 100 may include a transceiver 130 that performs communication through a wireless network. In addition, the pore visualization service providing server 100 may further include an input interface device 140, an output interface device 150, the storage device 160, and the like. Components included in the pore visualization service providing server 100 may be connected to each other by a bus 170 to perform communication. In FIG. 6, the pore visualization service providing server 100 has been described as an example, but the present disclosure is not limited thereto. For example, a plurality of user terminals may include the components according to FIG. 6.

According to various embodiments of the present disclosure, by providing an artificial neural network having an algorithm in charge of processes from pre-processing of an obtained face image to pore visualization, a small number of weights, and a low computational cost, a pore visualization service can be provided to a user at a low cost and at a high speed.

Effects of embodiments of the present disclosure are not limited to the effects mentioned above, and other effects not mentioned will be clearly understood by those skilled in the art from the description of the present disclosure.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software.

Examples of a computer-readable recording medium include hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

In addition, all or part of the configuration or function of the above-described method or apparatus may be implemented in combination or implemented separately.

Although the present disclosure has been described above with reference to the embodiments of the present disclosure, those skilled in the art may variously modify and change the present disclosure without departing from the spirit and scope of the present disclosure as set forth in the claims below.

DESCRIPTION OF SYMBOLS

100: PORE VISUALIZATION SERVICE PROVIDING SERVER
200: USER TERMINAL

What is claimed is:

1. A pore visualization service providing server based on artificial intelligence, comprising:
 a data pre-processor for obtaining a user's face image captured by a user terminal from the user terminal and performing pre-processing based on facial feature points based on the face image;
 a pore image extractor for generating a pore image corresponding to the user's face image by inputting the user's face image that has been pre-processed through the data pre-processing into an artificial neural network;
 a data post-processor for post-processing the generated pore image;
 a pore visualization service providing unit for superimposing the post-processed pore image on the face image and transmitting a pore visualization image to the user terminal; and
 a reliability evaluation unit for calculating reliability of the post-processed pore image,
 wherein the pore visualization service providing unit calculates a pore condition score for each of a plurality of face images according to sizes of pores detected based on each of the face images; calculates the number of pixels occupied by each of the detected pores; calculates the pore condition score based on a sum of the calculated pixel number; arranges pore visualization images corresponding to the face images according to time order or pore condition score order; and transmits the arranged pore visualization images to the user terminal, and
 the reliability evaluation unit calculates a first number of pores detected based on the post-processed pore image; calculates a second number of pores detected based on a previous pore image generated based on a previous face image of the user captured before capturing the face image; and evaluates reliability of the post-processed pore image by comparing the first and second numbers.

2. The pore visualization service providing server according to claim 1, wherein the pore image extractor comprises a pore image extraction model that is subjected to supervised learning using training data composed of a training input value corresponding to a face image of each of the users and a training output value corresponding to a pore image and generates the pore image corresponding to the user based on a deep learning network consisting of a plurality of hidden layers, and the pore image extractor inputs the pre-processed face image of the user into a pore image extraction model, which is the artificial neural network based on a convolutional neural network (CNN), and generates the pore image corresponding to the face image based on an output of the pore image extraction model.

3. The pore visualization service providing server according to claim 2, wherein the pore image extraction model comprises a feature map extraction layer comprising at least one convolutional layer that receives a learning feature vector obtained by transforming learning data according to a face image of a preset size, at least one activation layer, and at least one pooling layer;

a fully-connected layer that transmits an output vector calculated using output values received from the feature map extraction layer to an output layer; and an output layer that determines a probability corresponding to the output vector by applying an activation function to the output vector, and outputs an output vector having the highest determined probability.

4. The pore visualization service providing server according to claim 1, wherein the data pre-processor sets facial feature points for the face image, wherein, when a user's face is tilted in a specific direction within a preset angle range with respect to the facial feature points, the data pre-processor adjusts an orientation of the user's face in a direction opposite to the specific direction, and the data pre-processor sets a rectangular boundary comprising a face region of the user based on the facial feature points; crops a background region excluding the set rectangular boundary; and adjusts a resolution of the face image to a preset resolution while maintaining an aspect ratio of the face image with the background region cropped, wherein, when the resolution of the face image is less than the preset resolution, the data pre-processor inserts a black region into a region excluding the face region.

5. The pore visualization service providing server according to claim 1, wherein the data post-processor binarizes the generated pore image or transforms the generated pore image into a probability map, and based on cropping information and warping information comprised in the facial feature points, the data post-processor corrects a position of the binarized pore image or a position of the pore image transformed into a probability map so that the binarized pore image or the pore image transformed into a probability map corresponds to each pixel of the face image.

\* \* \* \* \*